United States Patent
Dellmann et al.

(10) Patent No.: US 8,937,788 B2
(45) Date of Patent: Jan. 20, 2015

(54) WRITE HEAD INCLUDING YOKE AND WINDINGS

(71) Applicant: International Business Machines Corporation, Armonk, NY (US)

(72) Inventors: Laurent A. Dellmann, Rueschlikon (CH); Johan B. C. Engelen, Rueschlikon (CH); Simeon Furrer, Rueschlikon (CH); Mark A. Lantz, Rueschlikon (CH); Hugo E. Rothuizen, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/892,457

(22) Filed: May 13, 2013

(65) Prior Publication Data
US 2013/0321953 A1    Dec. 5, 2013

(30) Foreign Application Priority Data
May 31, 2012 (GB) .................................. 1209674.9

(51) Int. Cl.
| | | |
|---|---|---|
| G11B 5/265 | (2006.01) | |
| G11B 5/008 | (2006.01) | |
| G11B 5/17 | (2006.01) | |
| G11B 5/31 | (2006.01) | |
| G11B 5/592 | (2006.01) | |

(52) U.S. Cl.
CPC ............. *G11B 5/265* (2013.01); *G11B 5/00826* (2013.01); *G11B 5/17* (2013.01); *G11B 5/3123* (2013.01); *G11B 5/5928* (2013.01)
USPC ........................................................ 360/121

(58) Field of Classification Search
CPC .. G11B 5/265; G11B 5/00826; G11B 5/5928; G11B 5/3123
USPC ................................... 360/121, 123.06, 318.1
See application file for complete search history.

(56) References Cited

U.S. PATENT DOCUMENTS

| | | | | |
|---|---|---|---|---|
| 3,685,144 | A * | 8/1972 | Trimble | ...................... 29/603.14 |
| 3,881,191 | A * | 4/1975 | Potter et al. | ................... 360/121 |
| 4,644,432 | A * | 2/1987 | Heim | ........................ 360/125.01 |
| 4,684,438 | A * | 8/1987 | Lazzari | ........................... 216/22 |
| 6,005,737 | A | 12/1999 | Connolly et al. | |
| 6,417,989 | B1 * | 7/2002 | Yang | ............................. 360/121 |
| 6,542,325 | B1 * | 4/2003 | Molstad et al. | ............. 360/77.12 |

(Continued)

FOREIGN PATENT DOCUMENTS

| | | |
|---|---|---|
| EP | 0690442 A2 | 1/1996 |
| JP | 2009271982 A | 11/2009 |
| WO | 2011054568 A1 | 5/2011 |

OTHER PUBLICATIONS

Sharat Batra, et al., "A Perpendicular Write Head Design for High-Density Recording," IEEE Transactions on Magnetics, vol. 38, No. 1, Jan. 2002, pp. 1-6.

(Continued)

*Primary Examiner* — Angel Castro
(74) *Attorney, Agent, or Firm* — Cantor Colburn LLP

(57) ABSTRACT

A write head comprising a yoke having at least a first and a second gap and a coil for producing a magnetic field at each gap, the coil comprising a plurality of windings, wherein the windings are arranged so as to produce the same magnetic field strength at each gap and/or along each gap by use of a proximity effect between the windings and a respective gap.

15 Claims, 8 Drawing Sheets

(56) References Cited

U.S. PATENT DOCUMENTS

| | | |
|---|---|---|
| 6,879,457 B2 * | 4/2005 | Eaton et al. .................... 360/75 |
| 6,943,987 B1 | 9/2005 | Raymond et al. |
| 7,199,957 B2 | 4/2007 | Rothermel et al. |
| 7,551,393 B2 | 6/2009 | Biskeborn et al. |
| 8,004,792 B2 | 8/2011 | Biskeborn et al. |
| 8,014,100 B2 | 9/2011 | Biskeborn et al. |
| 8,711,512 B2 * | 4/2014 | Kabelac .......................... 360/76 |
| 2008/0273264 A1 | 11/2008 | Biskeborn et al. |
| 2009/0316291 A1 | 12/2009 | Biskeborn et al. |
| 2010/0188774 A1 | 7/2010 | Biskeborn et al. |

OTHER PUBLICATIONS

UK Search Report; Application No. GB1209674.9; Patents Act 1977: Search Report Under Section 17(5); Sep. 26, 2012; pp. 1-3.

* cited by examiner

US 8,937,788 B2

WRITE HEAD INCLUDING YOKE AND WINDINGS

PRIORITY

This application claims priority to Great Britain Patent Application No. 1209674.9, filed May 31, 2012, and all the benefits accruing therefrom under 35 U.S.C. §119, the contents of which in its entirety are herein incorporated by reference.

BACKGROUND

The invention relates to a write head and to an apparatus.

In modern tape systems, data is organized in data tracks which are written and read back in a parallel fashion by a head assembly comprising data read and write heads, i.e., transducer elements. These data tracks run in the longitudinal direction of the magnetic tape and are much narrower than the excursions the magnetic tape experiences in the lateral direction as a result of imperfections in the mechanical entrainment system. Therefore, it is crucial to accurately position the head assembly relative to the magnetic tape in the lateral direction, and to maintain this relative position as the magnetic tape is streamed. To this end, as well as for other purposes, media manufacturers write servo tracks on the magnetic tape parallel to and interleaved with the data tracks. Servo read heads on the head assembly read the servo information stored in the servo tracks, which is then used for aligning the data read and write heads with the data tracks on the magnetic tape.

Servo tracks are typically written to the magnetic tape using one servo write head for each servo track. Each servo write head generally comprises a yoke having one or more gaps and a coil for producing a magnetic field at each gap. The write heads, in particular the gaps, are configured to imprint a specific pattern on the magnetic tape via fringing magnetic fields. This pattern, generally based on chevron shapes, contains the information required to determine the instantaneous lateral location of the data read and write heads (or the head assembly as a whole) using a time-based-servo (TBS) scheme as for example described in EP 0 690 442 A2.

For a TBS servo scheme to work accurately, one requirement is that several portions of the pattern located at different positions along the direction of motion of magnetic tape (e.g. the two branches of a chevron pattern) are written simultaneously, so that their imprints in the magnetic tape are always located at a fixed and accurate distance from each other independently of velocity jitter.

SUMMARY

In an exemplary embodiment, a write head includes a yoke having at least a first gap and a second gap; and a coil configured to produce a magnetic field at each gap, the coil comprising a plurality of windings; wherein the windings are arranged so as to produce one of: a same magnetic field strength at each gap, and a same magnetic field strength along each gap, by use of a proximity effect between the windings and a respective gap.

In another embodiment, an apparatus includes a magnetic media; and a write head configured to write a magnetic pattern on the magnetic media, the write head comprising a yoke having at least a first gap and a second gap, and a coil configured to produce a magnetic field at each gap, the coil comprising a plurality of windings, wherein the windings are arranged so as to produce one of: a same magnetic field strength at each gap, and a same magnetic field strength along each gap, by use of a proximity effect between the windings and a respective gap.

BRIEF DESCRIPTION OF THE SEVERAL VIEWS OF THE DRAWINGS

In the following, exemplary embodiments of the present invention are described with reference to the enclosed figures.

Similar or functionally equivalent elements in the figures have been allocated the same reference numbers if not otherwise indicated.

DETAILED DESCRIPTION

Figure 1:
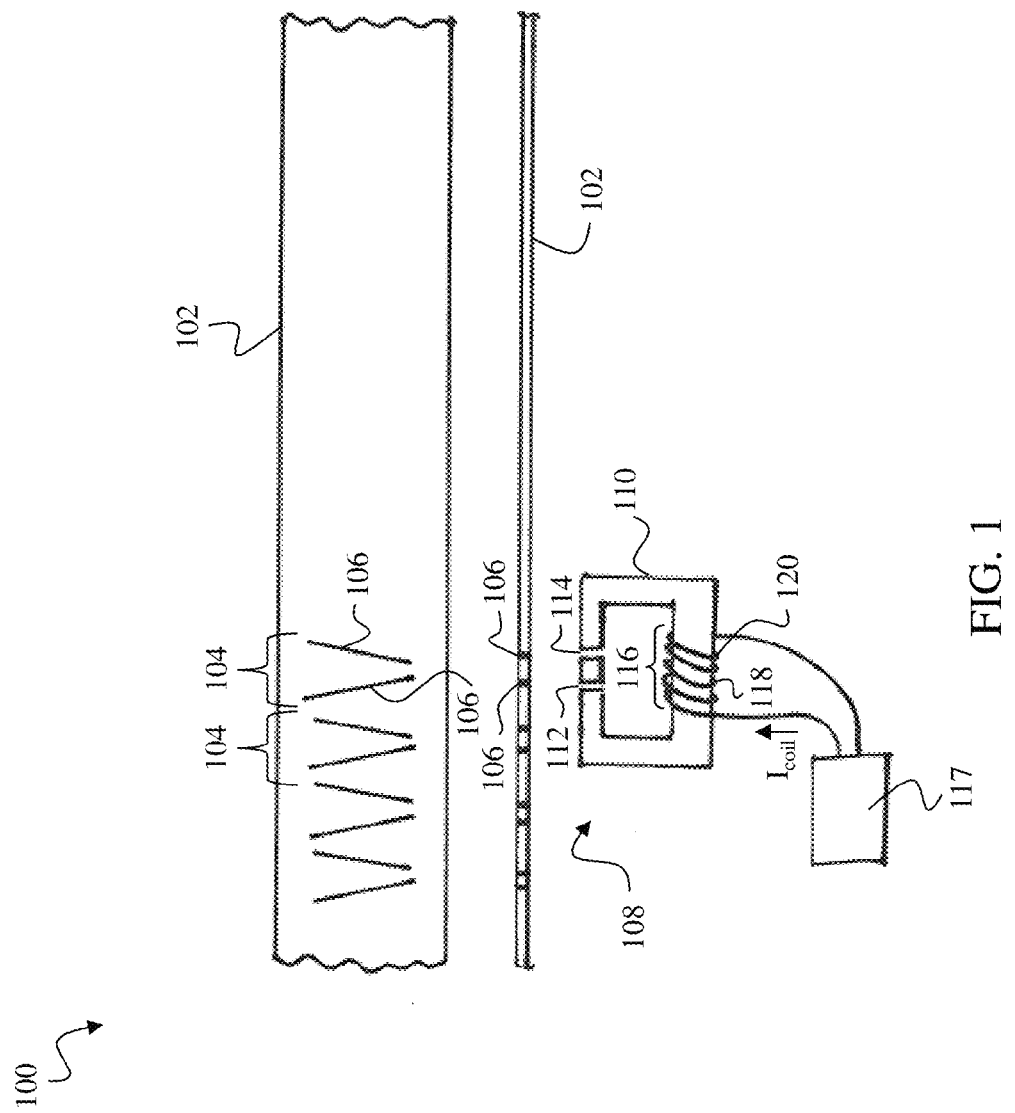
FIG. 1 shows schematically an apparatus according to an embodiment.

According to a first aspect a write head is provided. The write head comprises a yoke having at least a first and a second gap. Further, the write head has a coil for producing a magnetic field at each gap, the coil comprising a plurality of windings. The windings are arranged so as to produce the same magnetic field strength at each gap and/or along each gap by use of a proximity effect between the windings and a respective gap.

Since the magnetic field strengths at the gaps are thus the same and/or the same along each gap, the distance between portions of the servo pattern imprinted on the magnetic media may be accurately controlled, thereby increasing track-follow accuracy of the data read and write heads during data reading and writing.

In particular, "the same magnetic field strength at each gap" is to say that the magnetic field strength at comparable positions of the gaps is the same. In addition (or alternatively), the magnetic field strength may be the same along each gap.

"Along" each gap refers to the lengthwise direction of a respective gap.

A "winding" presently refers to one complete turn of the coil. Yet, "winding" does not imply that the coil is made by the process of winding. This may be the case, but other techniques such as thin film fabrication involving deposition or plating for example are also viable.

A "gap" presently refers to an interruption in the yoke defined between opposite magnetic poles.

The yoke comprises a magnetic material, for example iron, and is magnetized when a current flows through the coil. In an example, the yoke is ring shaped. The ring shape may be of a rectangular, square, circular or other nature. Yet, the ring shape is interrupted by the gaps. Other interruptions may also be present. The yoke may comprise a back portion, a front portion and side portions. The back and front portion may oppose each other. Also, the side portions may oppose each other. The coil may wind around any one or multiple of these portions.

The write head may be assembled from separately fabricated parts, or built up from a planar substrate using thin-film microfabrication techniques. The latter method presents advantages in terms of fabrication and decreased inductance and current, which enables writing more abrupt servo patterns and/or formatting the magnetic media at a greater speed. For example, the write head may be built on a wafer, for example a silicon or AlTiC (Aluminum-Titanium-Carbide) wafer.

For most applications based on a ring-topology electromagnet, the amount of magnetic flux generated at a given location of the magnetic circuit has a negligible dependence on the location where the windings of the coil are wrapped around the ring. In the present case, however, where the gaps and windings are close together, as is typical of a write head manufactured according to microfabrication techniques, a greater proportion of the magnetic flux induced at the gaps depends on the proximity of that location to individual windings of the coil (so called proximity effect).

This can be understood from the Biot-Savart Law:

$$B = \frac{\mu_0 I}{4\pi} \int \frac{d\ell \times \hat{r}}{r^2},$$

which, qualitatively, states an inverse dependence of the magnitude of the flux density B, generated at a given location, on that location's distance r to a current-carrying conductor. Thus, the "proximity effect" refers to there being substantial short-range contributions to the total magnitude of the generated magnetic field.

As a consequence, the amount of flux generated at a gap may be modulated by modifying the density of windings in the vicinity of the gap. For example, decreasing the distance between neighboring windings adjacent to a gap will increase the local flux generated at the gap, and enhance the magnitude of the write field generated at the gap accordingly. It follows that by acting locally on the layout of the windings, the relative magnetic field strengths of the gaps may be tuned so as to achieve equalization.

For example, any (a priori) irregular arrangement of the windings may serve the purpose of equalizing the magnetic field strengths at the gaps by use of the proximity effect.

The coil may be arranged asymmetrically with respect to the yoke and/or to the gaps. In this manner space constraints may be accommodated for. Also, the asymmetrical arrangement of the coil may simplify fabrication of the write head.

According to a further aspect, the gaps are arranged in a pattern symmetrical about a first line of symmetry, and the windings comprise winding portions arranged in a pattern symmetrical about a second line of symmetry, wherein the first and second lines of symmetry are offset from each other. The gaps may be formed in a chevron pattern, for example.

According to a further aspect, a distance between neighboring winding portions of windings adjacent to the first gap and neighboring winding portions of windings adjacent to the second gap varies in one direction.

Presently, "adjacent" may refer to the shortest distance between a pole forming the gap and a winding portion being smaller than 10 µm, 5 µm, 2 µm, 1 µm, 0.5 µm, 0.25 µm or 0.1 µm.

According to a further aspect, the windings comprise winding portions of equal distance between neighboring winding portions, wherein the winding portions are grouped in at least a first and a second group, the first group being arranged adjacent to the first gap and the second group being arranged adjacent to the second gap. Each group may comprise three or more winding portions, wherein the distance between neighboring winding portions within each group is the same and varies from group to group.

According to a further aspect, a first portion of a first winding portion of windings adjacent to the first gap and/or a first portion of a second winding portion of windings adjacent to the second gap run non-parallel to each other.

According to a further aspect, a first portion of a first winding portion of windings adjacent to the first gap runs parallel to the first gap and/or a second portion of the first winding portion adjacent to the first gap runs non-parallel to the first gap and/or a first portion of a second winding portion of windings adjacent to the second gap runs parallel to the second gap and/or a second portion of the second winding portion adjacent to the second gap runs non-parallel to the second gap.

According to a further aspect, the coil winds around only one portion of the yoke.

According to a further aspect, the coil winds around at least two portions of the yoke. The two portions may be oriented differently, e.g. run at different angles, in particular. For example, the coil may wind around one side portion and the back portion of the yoke.

According to a further aspect, the coil winds around the at least two portions in opposite directions.

According to a further aspect, only a single coil is provided. In some cases, a single coil may be preferable to avoid switching transients of the coils, which may influence the accuracy of the pattern produced by the write head on the magnetic media. However, in other cases, it may be desirable to use more than one coil on the same yoke, for example two or three coils.

According to a further aspect, the coil has two planar portions arranged on top of each other.

According to a further aspect, the coil has a planar portion and a helical portion. The planar portion may be formed in a pancake shape. Further, when two or more coils are provided, the one coil may be a planar coil and the other coil may be a helical coil.

According to a further aspect, winding portions of the planar portion are arranged adjacent to the first gap and winding portions of the helical portion are arranged adjacent to the second gap.

According to a further aspect, the write head is a servo write head for writing servo control information.

According to a further aspect, the write head is manufactured utilizing thin-film microfabrication techniques.

According to a further aspect, an apparatus is provided. The apparatus comprises a magnetic media and the write head in accordance with the invention for writing a magnetic pattern on the magnetic media. The magnetic media may be formed as a magnetic tape.

Referring now to FIG. 1, there is shown an apparatus 100 according to an embodiment. The apparatus 100 includes a magnetic tape 102, which is shown in a top and a side view. The tape 102 has been imprinted with servo patterns 104 for part of its length. The servo patterns 104 form a servo track configured to position a head assembly, in particular data read and write heads, with respect to data tracks (not shown) of the tape 102. Each servo pattern 104 is formed as a chevron pattern comprising two branches 106 extending at an angle, i.e. the branches 106 are non-parallel.

Further, the apparatus 100 comprises a write head 108. Also, more than one write head 108 may be provided. The write head 108 comprises a yoke 110 having two gaps, a first gap 112 and a second gap 114. Also, the write head 108 comprises a coil 116. The coil 116 is configured for producing a magnetic field at each gap 112, 114, when a current $I_{coil}$ flows through the coil 116. A controller 117 may be provided controlling the current $I_{coil}$. The controller 117 may be an information-modulated current source. The coil 116 comprises a plurality of windings 118, 120. Further, the coil 116 may be arranged asymmetrically with regard to the gaps 112, 114 as will be illustrated in more detail in connection with FIG. 2A to 8B. The windings 118, 120 are arranged so as to produce the same magnetic field strength at each gap 112, 114, i.e. the same magnetic field between two opposite poles defining each gap 112, 114, by use of the proximity effect explained above. The two equal magnetic fields imprint each servo pattern 104 on the tape 102, wherein the distance between the branches 106 of a respective servo pattern 104 is accurately controlled. Exemplary arrangements of the windings 118, 120 are illustrated in FIG. 2A to 8B.

FIG. 2A to 8B illustrate exemplary embodiments of the write head 108, which may be used in the apparatus 100 of FIG. 1.

Figure 2A:
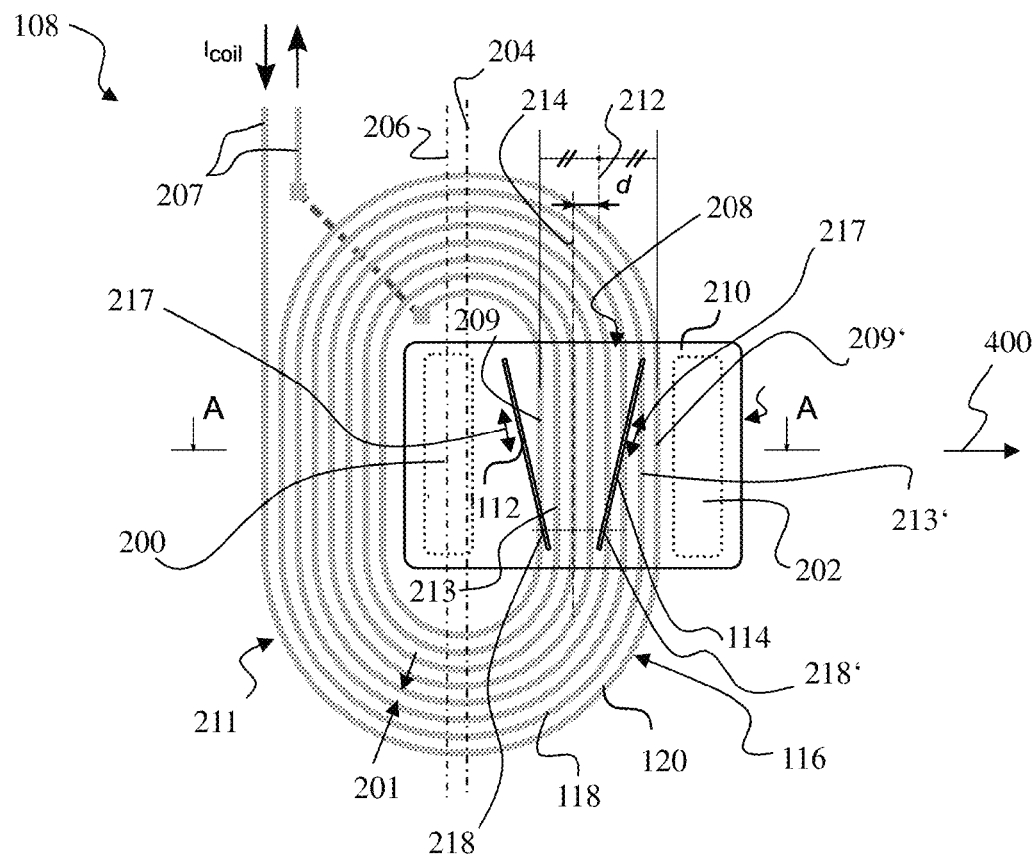
FIG. 2A shows schematically a write head according to a first embodiment.
Figure 2B:
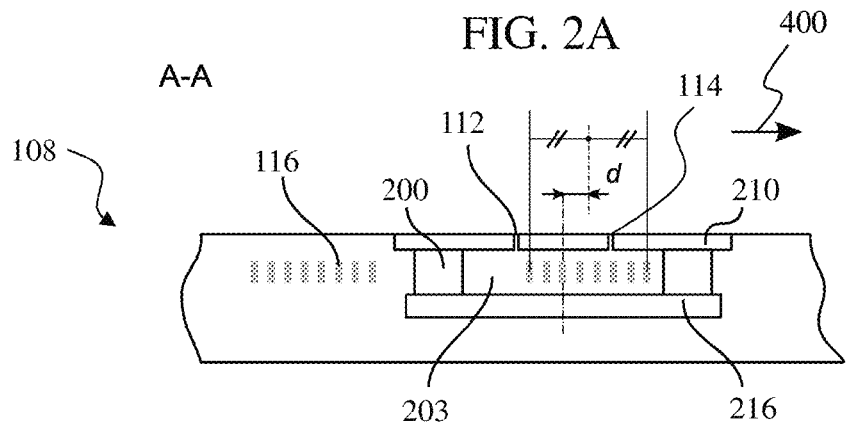
FIG. 2B shows a section view A-A from FIG. 2A.

FIG. 2A shows schematically a write head according to a first embodiment, and FIG. 2B shows a section view A-A from FIG. 2A.

The coil 116 is designed in a pancake shape. The pancake shape has multiple windings 118, 120 lying in a single plane (made of a thin film layer, for example). Each winding 118, 120 may define the shape of an elongated (or circular in another embodiment) hole therein. The distance 201 between neighboring windings 118, 120 is constant in an outward direction of the coil 116. The coil 116 is wrapped around one of the two side portions 200, 202 of the yoke 110. This already results in an asymmetric arrangement of the coil 116 with respect to the gaps 112, 114. In addition, the coil 116 may be arranged asymmetrically with respect to the side portion 200 around which it is wrapped, i.e. its centerline 204 is offset from the centerline 206 of the side portion 200. The coil 116 and the yoke 110 link to each other in a chain-like fashion. The coil 116 may be embedded in a dielectric layer 203 or layers such that it is physically supported and is not electrically shorted by contact with the yoke 110 or the poles formed at the gaps 112, 114. The two ends 207 of the coil 116 may be contacted electrically through vias in the embedding dielectric layer 203.

A portion 208 of the coil 116 overlaps with a front portion 210 of the yoke 110 comprising the gaps 112, 114 as seen in FIG. 2A. The plane of the coil 116 is parallel to the plane in which both gaps 112, 114 extend. It will be noted that, in the top view of FIG. 2A, a remaining portion generally designated at 211 of the coil 116 is not covered by the front portion 210 or any other portion of the yoke 110 for that matter. The portion 208 of the coil 116 may be rectangular and may consist only of winding portions 209, 209', 213, 213' symmetrical about a line of symmetry 212. Also, the pattern of the gaps 112, 114 is symmetrical with respect to a line of symmetry 214. The lines 212 and 214 are parallel and offset by a distance d for the purpose of equalizing the strengths of the magnetic fields at the gaps 112, 114 by use of the proximity effect mentioned above. The magnetic fields are thus the same at comparable positions 218, 218' along the length 217 of each gap 112, 114. In one example, the magnetic fields are also the same (i.e. constant) along the length 217 of each gap 112, 114. For example, comparable positions 218, 218' of the gaps 112, 114 may lie on the same line (see dotted line in FIG. 2a) in the direction of travel 400 of the magnetic tape 102.

In addition to the side portions 200, 202 and the front portion 210, the yoke 110 also has a back portion 216. The portions 200, 202, 210 and 216 may form a rectangular shape in this embodiment. Also, the portion 200 (or any other portion) of the yoke 110 has a rectangular cross-section as seen in FIG. 2A. The rectangular cross-section of the portion 200 is aligned with the elongated shape of the windings 118, 120.

The embodiments according to FIG. 3A to 8B are largely based on the first embodiment of FIG. 2A and FIG. 2B. In particular, the explanations about the magnetic fields (comparable positions 218, 218' etc.) equally apply to the embodiments of FIG. 3A to 8B.

Figure 3A:
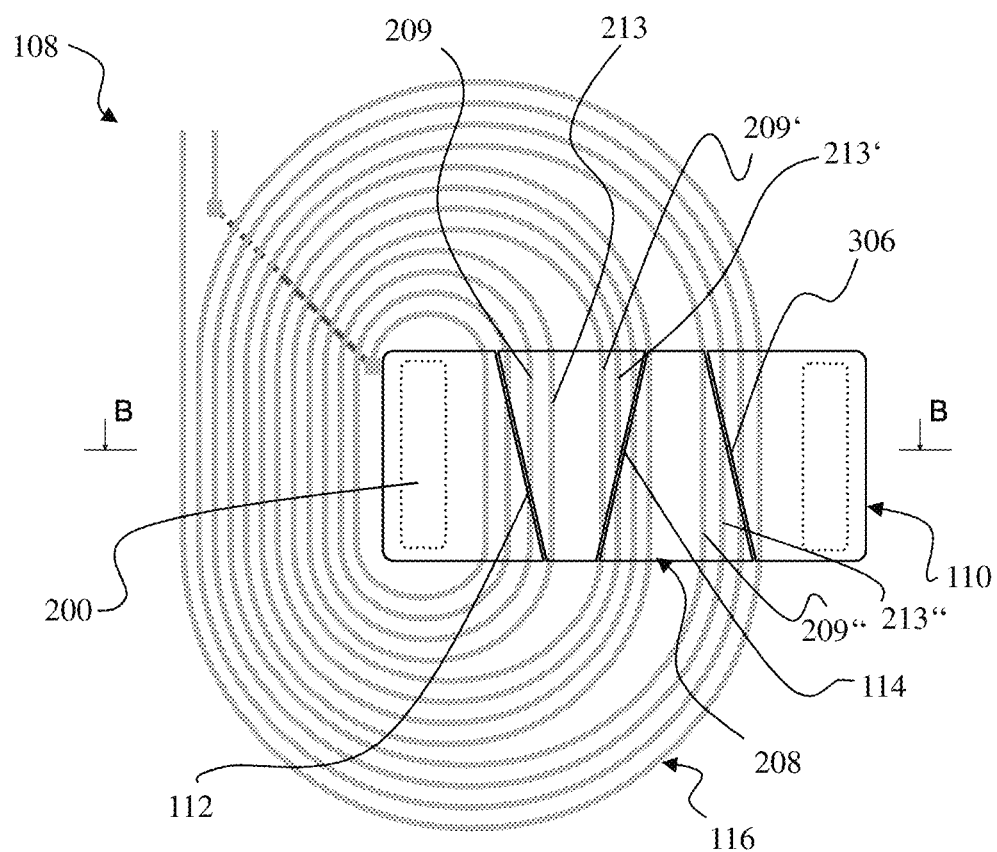
FIG. 3A shows schematically a write head according to a second embodiment.
Figure 3B:
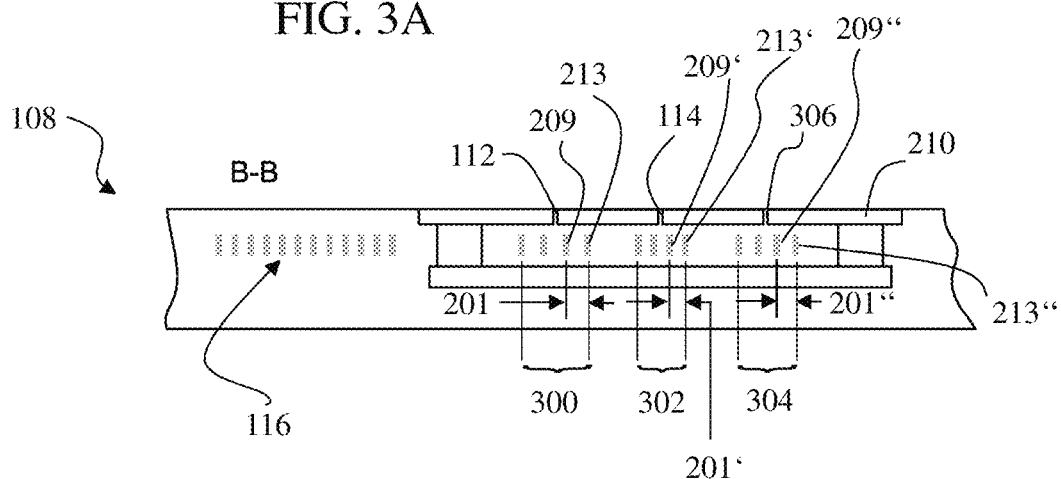
FIG. 3B shows a section view B-B from FIG. 3A.

FIG. 3A shows schematically a write head 108 according to a second embodiment, and FIG. 3B shows a section view B-B from FIG. 3A.

The write head 108 according to the second embodiment differs from the first embodiment in that the portion 208 of the coil 116 overlapping with the front portion 210 of the yoke 110 has winding portions 209, 213, 209', 213', 209", 213" arranged in a first, second and third group 300, 302, 304. The first group 300 is arranged adjacent to the first gap 112, the second group 302 is arranged adjacent to the second gap 114 and the third group 304 is arranged adjacent to a third gap 306 formed in the front portion 210 of the yoke 110.

The distance 201, 201', 201" between two neighboring winding portions 209, 213, 209', 213', 209", 213" varies from group to group so as to produce the same magnetic field strength at each gap 112, 114, 306 by use of the proximity effect mentioned above. The distances 201, 201', 201" between two neighboring winding portions 209, 213, 209', 213', 209", 213" within one group 300, 302, 304 are constant. Each group 300, 302, 304 may comprise more than two winding portions 209, 213, 209', 213', 209", 213".

Any combination of the above two arrangement methods (offset, varied distance) according to the first and second embodiment may be used for the purpose of controlling the magnetic field strength at the gaps 112, 114, 306. In particular, the portion 208 (first embodiment) or the groups 300, 302, 304 do not need to contain winding portions 209, 213, 209', 213', 209", 213" being spaced apart a constant distance 201, 201', 201", respectively. A continuously varied distance (e.g. in the outward direction of the coil 116) may also be desirable, as is also any (a priori) random arrangement of the winding portions 209, 213, 209', 213', 209" which ensures the effect of equalizing the magnetic field strengths of the gaps 112, 114, 306 by use of the proximity effect mentioned above.

Figure 4A:
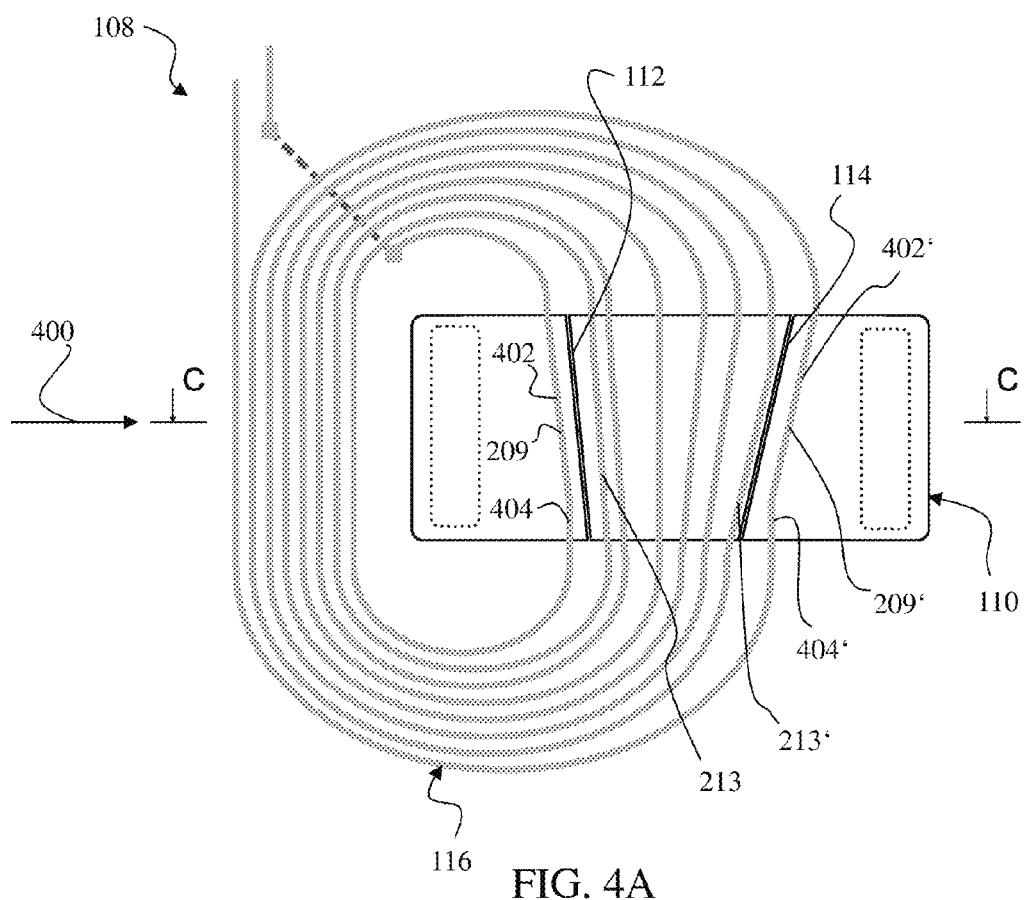
FIG. 4A shows schematically a write head according to a third embodiment.
Figure 4B:
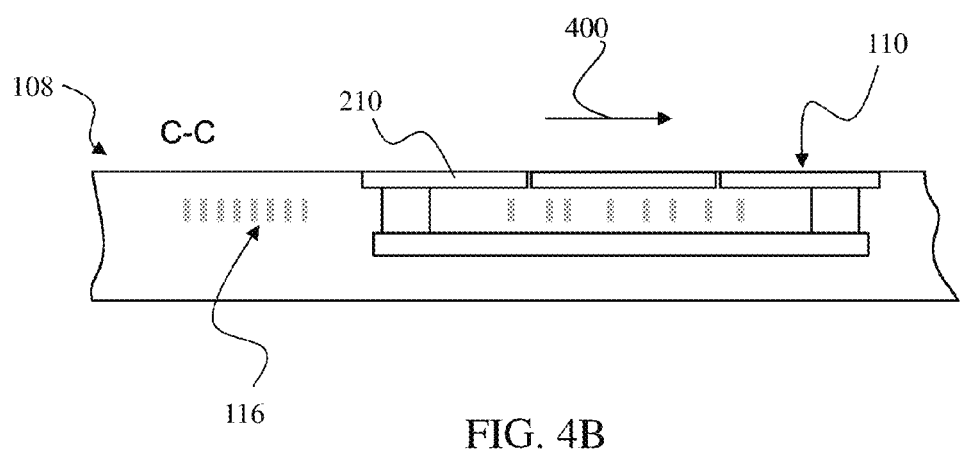
FIG. 4B shows a section view C-C from FIG. 4A.

FIG. 4A shows schematically a write head 108 according to a third embodiment, and FIG. 4B shows a section view C-C from FIG. 4A.

The write head 108 according to the third embodiment illustrates that the winding portions 209, 209', 213, 213' overlapping with the front portion 210 need not be parallel to one another or be perpendicular to the direction of travel 400 of the magnetic tape 102. In particular, it may be advantageous to lay the winding portions 209, 209', 213, 213' at least partially parallel to the gaps 112, 114, so as to improve equalization of the magnetic field strength along the long axis of each gap 112, 114.

Thus, a first winding portion 209 adjacent to the first gap 112 and a second winding portion 209' adjacent to the second gap 114 run non-parallel to each other. Also, the first winding portion 209 has a first portion 402 that runs parallel to the first gap 112 and a second portion 404 that runs non-parallel to the first gap 112. And, the second winding portion 209' has a first portion 402' that runs parallel to the second gap 114 and a second portion 404' that runs non-parallel to the second gap 114. In the third embodiment, equalization of the field strengths at the gaps 112, 114 is achieved by using the proximity effect mentioned above.

Figure 5:
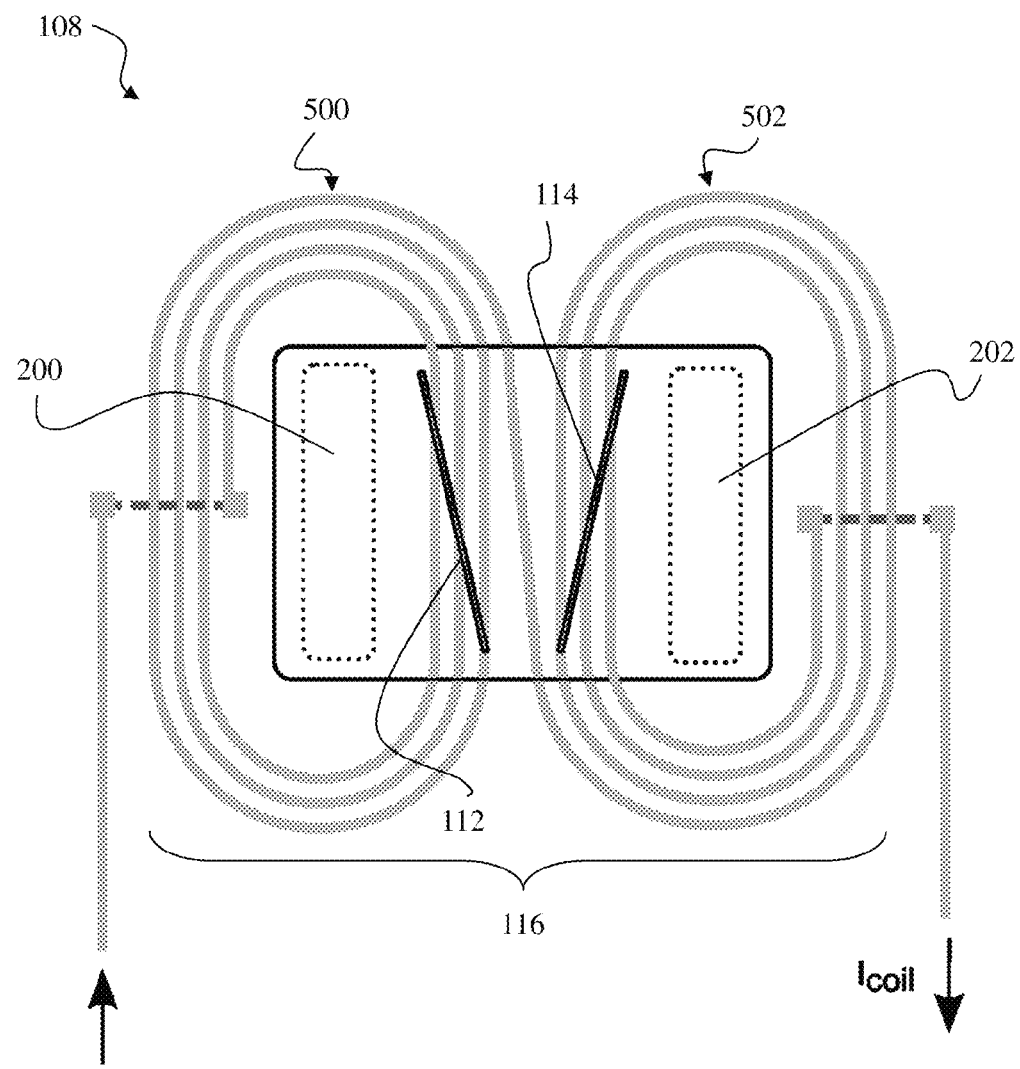
FIG. 5 shows schematically a write head according to a fourth embodiment.

FIG. 5 shows schematically a write head 108 according to a fourth embodiment.

The write head 108 according to the fourth embodiment comprises a coil 116 (pancake-shaped) which is wrapped around both side portions 200, 202 of the yoke 110. The two halves 500, 502 of the coil 116 are wrapped in opposite directions (one clockwise, the other counterclockwise), so that their individual contributions to the magnetic flux generated in the yoke 110 add to each other. This layout is advantageous for situations in which the gaps 112, 114 are mirror symmetric: the additional symmetry of the arrangement of the coil 116 equalizes magnetic field strengths at the gaps 112, 114. This layout also has the advantage, compared to an asymmetrically wound coil (first to third embodiment) with the same number of turns, of having a shorter total conductor length, which implies a lower electrical resistance.

Figure 6A:
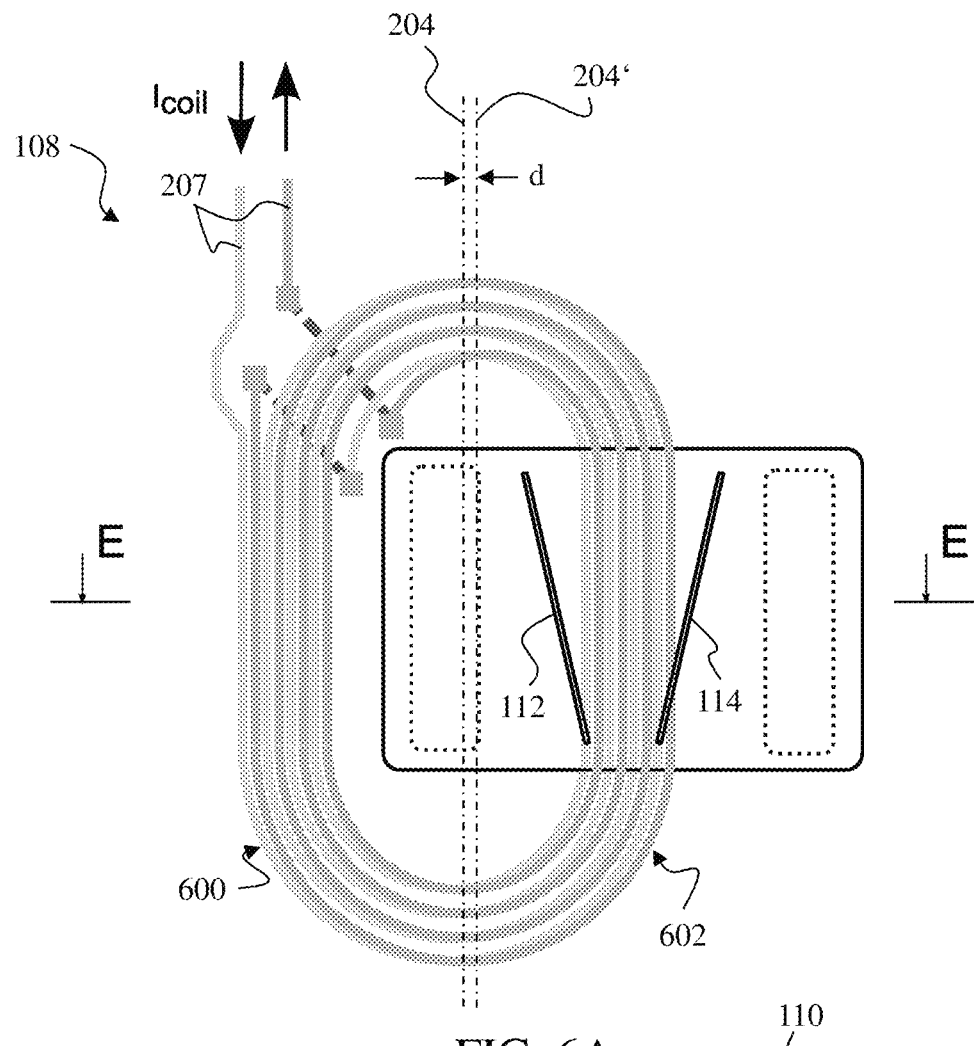
FIG. 6A shows schematically a write head according to a fifth embodiment.
Figure 6B:
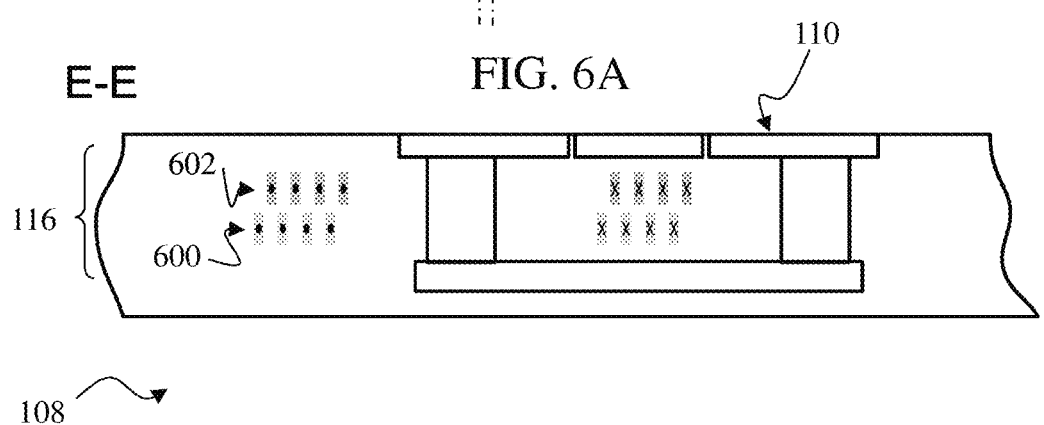
FIG. 6B shows a section E-E from FIG. 6A.

FIG. 6A shows schematically a write head 108 according to a fifth embodiment, and FIG. 6B shows a section E-E from FIG. 6A.

The coil 116 may be built in two or more parallel layers. A first half 600 of the coil 116 is arranged in a first layer (possibly a thin film layer) and a second half 602 of the coil 116 is arranged in a second layer (possibly another thin film layer). The first and second layer are arranged on top of each other. Also, the lines of symmetry 204, 204' of the first and second half 600, 602 may be offset to each other by a distance d. The same current Icoil flows through both halves 600, 602. This approach may be combined with any of the coil layouts described above (first to fourth embodiment). The same magnetic fields at the gaps 112, 114 are obtained by using the proximity effect mentioned above.

Figure 7A:
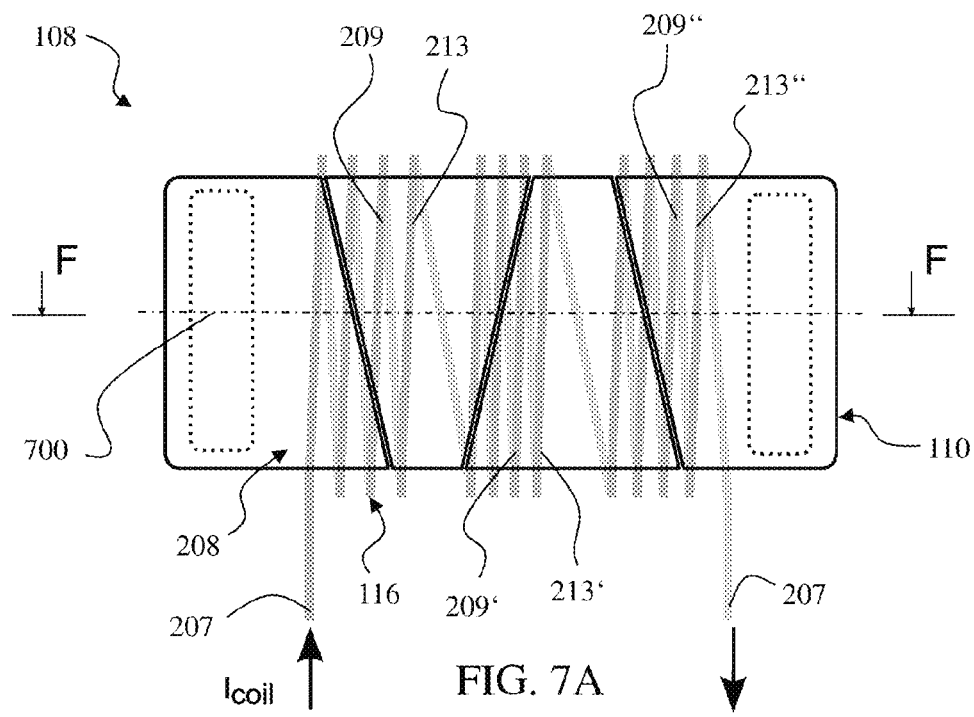
FIG. 7A shows schematically a write head according to a sixth embodiment.
Figure 7B:
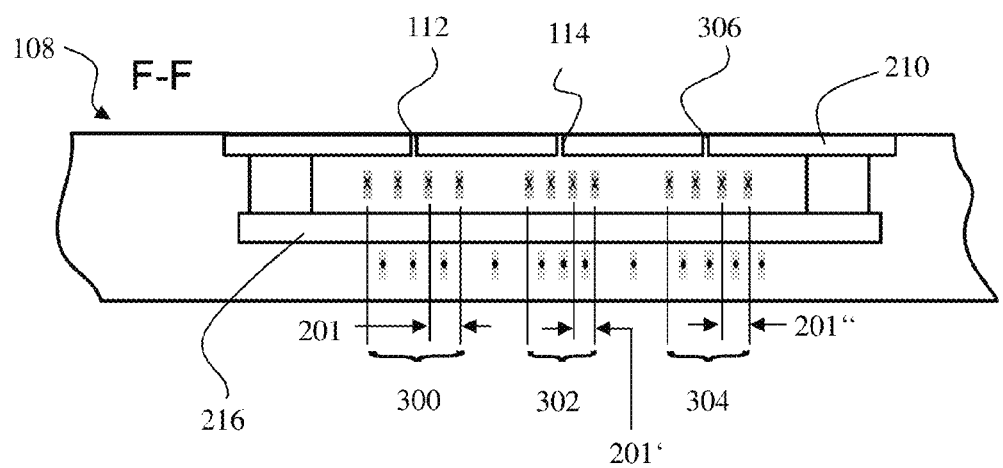
FIG. 7B shows a section F-F from FIG. 7A.

FIG. 7A shows schematically a write head 108 according to a sixth embodiment, and FIG. 7B shows a section F-F from FIG. 7A.

The write head 108 according to the sixth embodiment has a helical coil 116 which may be wrapped around the back portion 216 of the yoke 110. Analogously to the embodiment of FIGS. 3A and 3B, a portion 208 of the coil 116 overlapping with the front portion 210 of the yoke 110 has winding portions 209, 213, 209', 213', 209", 213" arranged in a first, second and third group 300, 302, 304. The first group 300 is arranged adjacent to the first gap 112, the second group 302 is arranged adjacent to the second gap 114 and the third group 304 is arranged adjacent to a third gap 306 formed in the front portion 210 of the yoke 110. The distance 201, 201', 201" between two neighboring winding portions 209, 213, 209', 213', 209", 213" varies from group to group so as to produce the same magnetic field strength at each gap 112, 114, 306 by use of the proximity effect mentioned above.

Figure 8A:
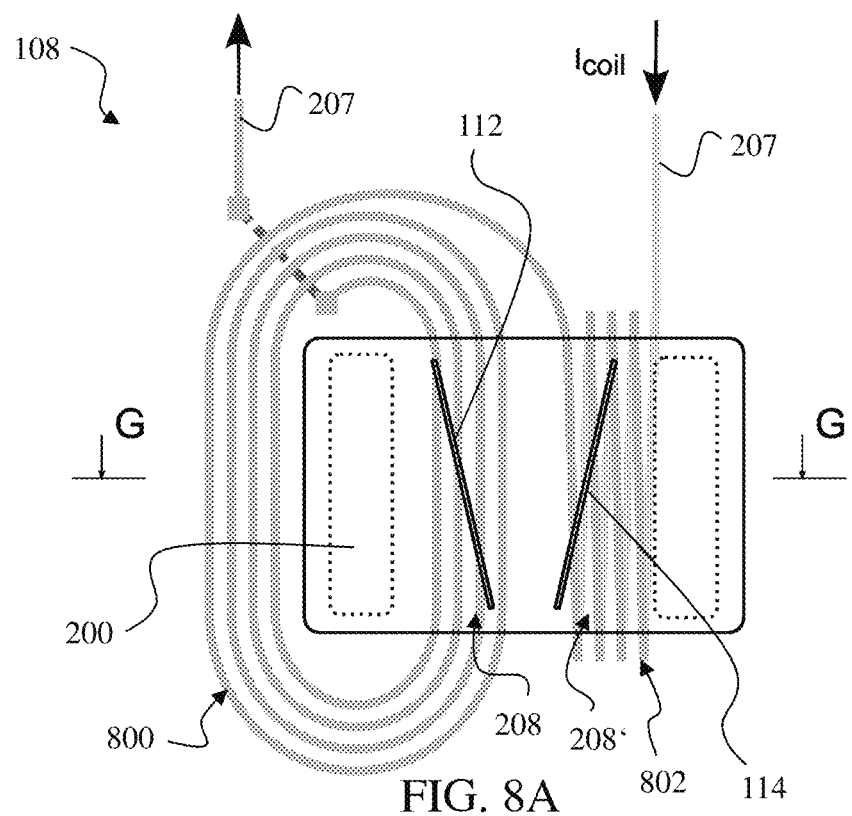
FIG. 8A shows schematically a write head according to a seventh embodiment.
Figure 8B:
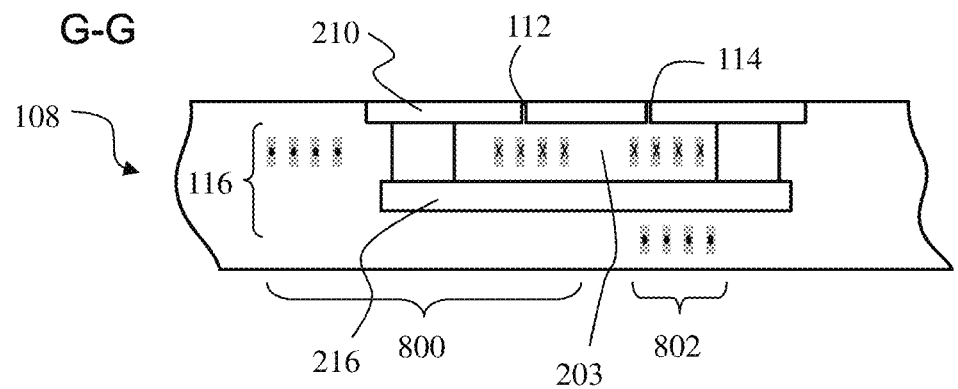
FIG. 8B shows a section G-G from FIG. 8A.

FIG. 8A shows schematically a write head 108 according to a seventh embodiment, and FIG. 8B shows a section G-G from FIG. 8A.

The write head 108 according to the seventh embodiment has a coil 116 comprising a pancake and a helical portion 800, 802. The pancake portion 800 wraps around the side portion 200 of the yoke 110 and the helical portion 802 wraps around the back portion 216 of the yoke 110. The portion 208 of the pancake portion 800 overlapping with the front portion 210 of the yoke 110 is arranged adjacent to the first gap 112. The portion 208' of the helical portion 802 overlapping with the front yoke 210 is arranged adjacent to the second gap 114.

This approach is beneficial when it is desirable to achieve a compact coil cross-section, e.g. for write heads 108 which are closely packed laterally and where there is little space for coil windings 118, 120 to extend outward beyond the side portions 200, 202 of the yoke 110. This hybrid layout can yield a similar high cross-sectional coil compactness as would a multiply-layered helical coil, but at a lesser cost in complexity of fabrication. In particular, the portions 800, 802 share an upper layer (possibly embedded in the same dielectric layer 203), which simplifies fabrication.

Although the present invention has been described in accordance with preferred embodiments, it is obvious for a person skilled in the art that modifications are possible in all embodiments.

In particular, all embodiments may be combined with one another. For example, in the seventh embodiment of FIGS. 8A and 8B the distance between winding portions may vary in the outward direction as explained in connection with the second embodiment of FIGS. 2A and 2B.

The invention claimed is:

1. A write head, comprising:
   a yoke having at least a first gap and a second gap; and
   a coil configured to produce a magnetic field at each gap, the coil comprising a plurality of windings;
   wherein the windings are arranged with a changing intra-coil winding density so as to produce one of: a same magnetic field strength at each gap, and a same magnetic field strength along each gap, by use of a proximity effect between the windings and a respective gap.

2. The write head of claim 1, wherein the gaps are arranged in a pattern symmetrical about a first line of symmetry, and the windings comprise winding portions arranged in a pattern symmetrical about a second line of symmetry, wherein the first and second lines of symmetry are offset from each other.

3. The write head of claim 1, wherein a distance between neighboring winding portions of windings adjacent to the first gap and neighboring winding portions of windings adjacent to the second gap varies in one direction.

4. The write head of claim 1, wherein the windings comprise winding portions of equal distance between neighboring winding portions, wherein the winding portions are grouped in at least a first and a second group, the first group being arranged adjacent to the first gap and the second group being arranged adjacent to the second gap.

5. The write head of claim 1, wherein a first portion of a first winding portion of windings adjacent to the first gap and/or a first portion of a second winding portion of windings adjacent to the second gap run non-parallel to each other.

6. The write head of claim 1, wherein a first portion of a first winding portion of windings adjacent to the first gap runs parallel to the first gap and/or a second portion of the first winding portion adjacent to the first gap runs non-parallel to the first gap and/or a first portion of a second winding portion of windings adjacent to the second gap runs parallel to the second gap and/or a second portion of the second winding portion adjacent to the second gap runs non-parallel to the second gap.

7. The write head of claim 1, wherein the coil winds around only one portion of the yoke.

8. The write head of claim 1, wherein the coil winds around at least two portions of the yoke.

9. The write head of claim 8, wherein the coil winds around the at least two portions in opposite directions.

10. The write head of claim 1, wherein only a single coil is provided.

11. The write head of claim 1, wherein the coil has two planar portions arranged on top of each other.

12. The write head of claim 1, wherein the coil has a planar portion and a helical portion, wherein winding portions of the planar portion are arranged adjacent to the first gap and winding portions of the helical portion are arranged adjacent to the second gap.

13. The write head of claim 1, wherein the write head is a servo write head for writing server control information.

14. The write head of claim 1, wherein the write head is manufactured utilizing thin-film micro fabrication techniques.

15. An apparatus comprising:
a magnetic media; and
a write head configured to write a magnetic pattern on the magnetic media, the write head comprising a yoke having at least a first gap and a second gap, and a coil configured to produce a magnetic field at each gap, the coil comprising a plurality of windings, wherein the windings are arranged with a changing intra-coil winding density so as to produce one of: a same magnetic field strength at each gap, and a same magnetic field strength along each gap, by use of a proximity effect between the windings and a respective gap.

* * * * *